(12) United States Patent
Gameiro et al.

(10) Patent No.: US 9,314,146 B2
(45) Date of Patent: Apr. 19, 2016

(54) APPARATUS FOR CLEANING ELECTRONIC DISPLAY SURFACES

(71) Applicants: Gil Gameiro, Pebble Beach, CA (US); Phillip Lembo, Monterey, CA (US)

(72) Inventors: Gil Gameiro, Pebble Beach, CA (US); Phillip Lembo, Monterey, CA (US)

(*) Notice: Subject to any disclaimer, the term of this patent is extended or adjusted under 35 U.S.C. 154(b) by 146 days.

(21) Appl. No.: 14/177,986

(22) Filed: Feb. 11, 2014

(65) Prior Publication Data
US 2014/0223680 A1    Aug. 14, 2014

Related U.S. Application Data

(60) Provisional application No. 61/850,157, filed on Feb. 11, 2013.

(51) Int. Cl.
*A47L 25/00* (2006.01)
*G06F 3/0488* (2013.01)

(52) U.S. Cl.
CPC ............... *A47L 25/00* (2013.01); *G06F 3/0488* (2013.01)

(58) Field of Classification Search
CPC combination set(s) only.
See application file for complete search history.

(56) References Cited

U.S. PATENT DOCUMENTS

| | | | |
|---|---|---|---|
| 4,013,369 A * | 3/1977 | Turek | A47L 13/10 401/139 |
| 5,213,430 A * | 5/1993 | Pandola | A47L 23/05 401/137 |
| 5,819,989 A | 10/1998 | Saraceni | |
| 6,431,405 B2 | 8/2002 | Irwin | |
| 6,457,890 B1 * | 10/2002 | Kohlruss | A47L 13/16 401/123 |
| 6,948,874 B2 | 9/2005 | Roberson | |
| 7,682,097 B2 | 3/2010 | Knopow et al. | |
| 7,743,947 B2 | 6/2010 | Flasch | |
| 7,841,795 B2 | 11/2010 | Huang | |
| 2004/0101347 A1 * | 5/2004 | Beard | A47L 1/15 401/139 |

* cited by examiner

*Primary Examiner* — David Walczak
(74) *Attorney, Agent, or Firm* — Law Offices of David M. Lang; David M. Lang (57) ABSTRACT

An integrated cleaning and dispensing apparatus. In one embodiment, the apparatus housing is triangularly shaped and contains within the housing, a dispenser to dispense cleaning solution onto a target surface to be cleaned. A covering is disposed around the outer perimeter surface of the apparatus. In alternative embodiments a cushioning layer is between the microfiber cover and the apparatus housing. In an alternative embodiment, the microfiber cover is attached by hook-and-loop fastener. In another embodiment the microfiber cover is attached to an elastic sleeve that may fit snugly over the outer surface. Other embodiments include a quadrilaterally shaped apparatus housing.

9 Claims, 12 Drawing Sheets

APPARATUS FOR CLEANING ELECTRONIC DISPLAY SURFACES

CROSS-REFERENCE TO RELATED APPLICATIONS

This application claims the benefit under 35 U.S.C. §119 (e), to U.S. Provisional Application U.S. 61/850,157 filed Feb. 11, 2013, entitled "PORTABLE HAND HELD DEVICE FOR THE PURPOSE OF CLEANING OR POLISHING SURFACES AND METHODS OF USE" which is incorporated by reference in its entirety and made part of this specification.

FIELD OF THE INVENTION

The present invention relates to an apparatus facilitating surface cleaning generally, and more specifically, apparatus adapted to hold and dispense cleaning solution. More specifically still, the present invention is directed to a uniquely-shaped integrated cleaner dispenser apparatus having a surface to clean and polish screens, particularly electronic displays.

BACKGROUND

Modern electronic devices often require user tactile interaction in which the user touches either a screen or another smooth touch-responsive surface. While tactile interaction with a touch-responsive surface is efficient, accumulation of grease, smudges, and even germs is inevitable. Aesthetically, the device is perceived as dirty. Viewing the display through the buildup of dirt and grime and is more difficult, and residue on the display's surface will frequently interfere with the operation of the screen's touch-sensitive digitizer. Current strategies for cleaning such devices are ineffective or impractical for portable electronics.

For example, a user could clean a handheld electronic device with a traditional bottle containing a cleaning solution and paper towels or cloth. Yet, these items are large and cumbersome and require the to user change hands to clean the unit. Further, such items are not portable. The use of touch-responsive electronic devices is on the rise, and users wish to clean them more frequently—and in public. Accordingly, a need exists for an integrated cleaning/polishing apparatus that is small, portable, easy to use, self-contained, and stylish. A user wishing to clean a portable electronic device in a public place such as a coffeehouse or restaurant needs an apparatus that is portable and can kept in a purse, laptop case, or pocket. The user needs an apparatus that is self-contained, neat, efficient to use, and sufficiently stylish to use in a public setting.

Several prior art devices teach apparatus capable of cleaning surfaces. For example U.S. Pat. No. 5,819,989 to Saraceni discloses, in part, an apparatus having a cleaning solution and a toweling roll to clean surfaces. U.S. Pat. No. 6,431,405 to Irwin, discloses, in part, a fluid dispenser and a pop-up sheet dispenser. U.S. Pat. No. 7,743,947 to Flasch, discloses, in part, an integrated spray and wipe system which includes a fluid reservoir that extends through center of a cleaning tissue roll. All of these devices use a conventional paper towel roll which is bulky, large, and not portable. All of these devices use paper towels—a cleaning material which is not suitable for electronic screens and monitors due to the tendency of toweling to fray and leave paper residue which may stubbornly cling to the display surface owing to electrostatic charge. Further, paper toweling is relatively rough and may mar sensitive surfaces.

U.S. Patent No. to Knopow, et al., discloses, in part, a device for applying a cleaning or polishing solution to a surface. Knopow discloses a relatively large apparatus which would not be portable, and is too cumbersome to clean portable electronics. Further, U.S. Pat. No. 6,948,874 to Roberson discloses, in part, a combination eraser for a marker board with a container to hold cleaning solution. A dry eraser is affixed to a bottom bracket by an adhesive means. Roberson's dry eraser is not an ideal cleaning surface for small electronic devices and the apparatus itself is larger than many portable electronic devices.

SUMMARY

One aspect of certain embodiments of the present invention discloses an integrated cleaning dispenser, laminated with a cleaning surface. Another aspect of certain embodiments of the present invention provides a push-button actuated dispenser incorporated within the cleaning apparatus. Another aspect of the present invention provides a uniquely-shaped integrated dispenser which may be triangularly shaped or quadrilaterally shaped. Another aspect of the present invention discloses an integrated dispenser having a soft surface cover, such as a microfiber surface lamination.

DETAILED DESCRIPTION

Figure 1:
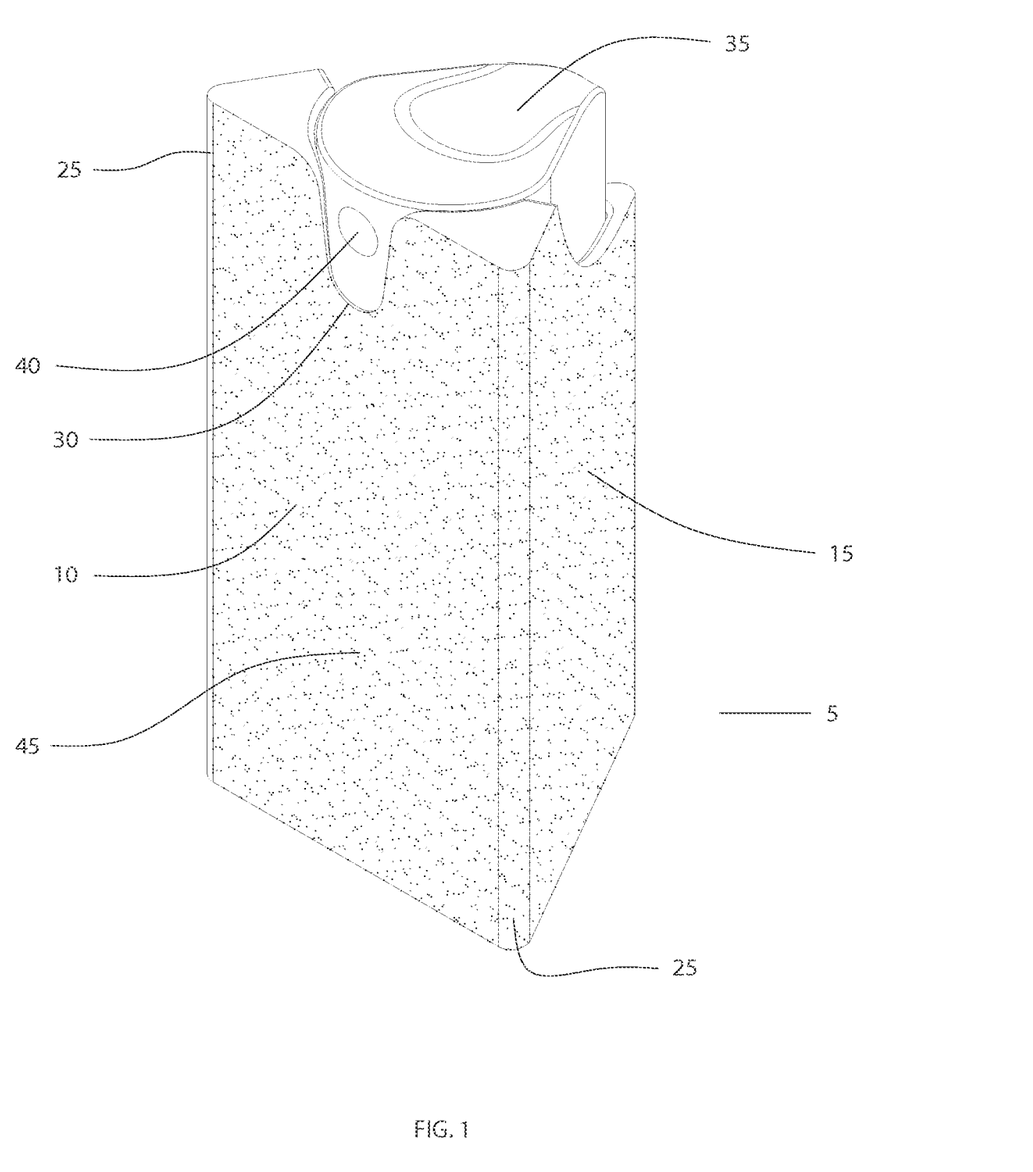
FIG. 1 is a perspective view of an embodiment integrated dispenser.

Turning now to FIG. 1 illustrating a perspective view of an embodiment triangularly-shaped integrated dispenser apparatus 5. Apparatus 5, is shaped to define a first covered surface 10, a second covered surface 15, and a third covered surface 20. First surface 10, second surface 15, and third surface 20 come together to form housing corners 25. First covered surface 10 is shaped to define a notch 30. Actuating cap 35 has a spray outlet 40, with actuating cap 35 operatively coupled to a dispenser pump 120. Covering 45, which in a preferred embodiment is microfiber, covers the entire perimetrical surface of triangularly-shaped apparatus 5. It should be noted that cover 45 may be comprised of a variety of materials including, microsuade, chamois, cotton, or a blend of different materials. It should also be noted that in an alternative embodiment, cover 45 covers fewer than all surfaces, and/or may only cover only a section of a single surface.

Figure 2:
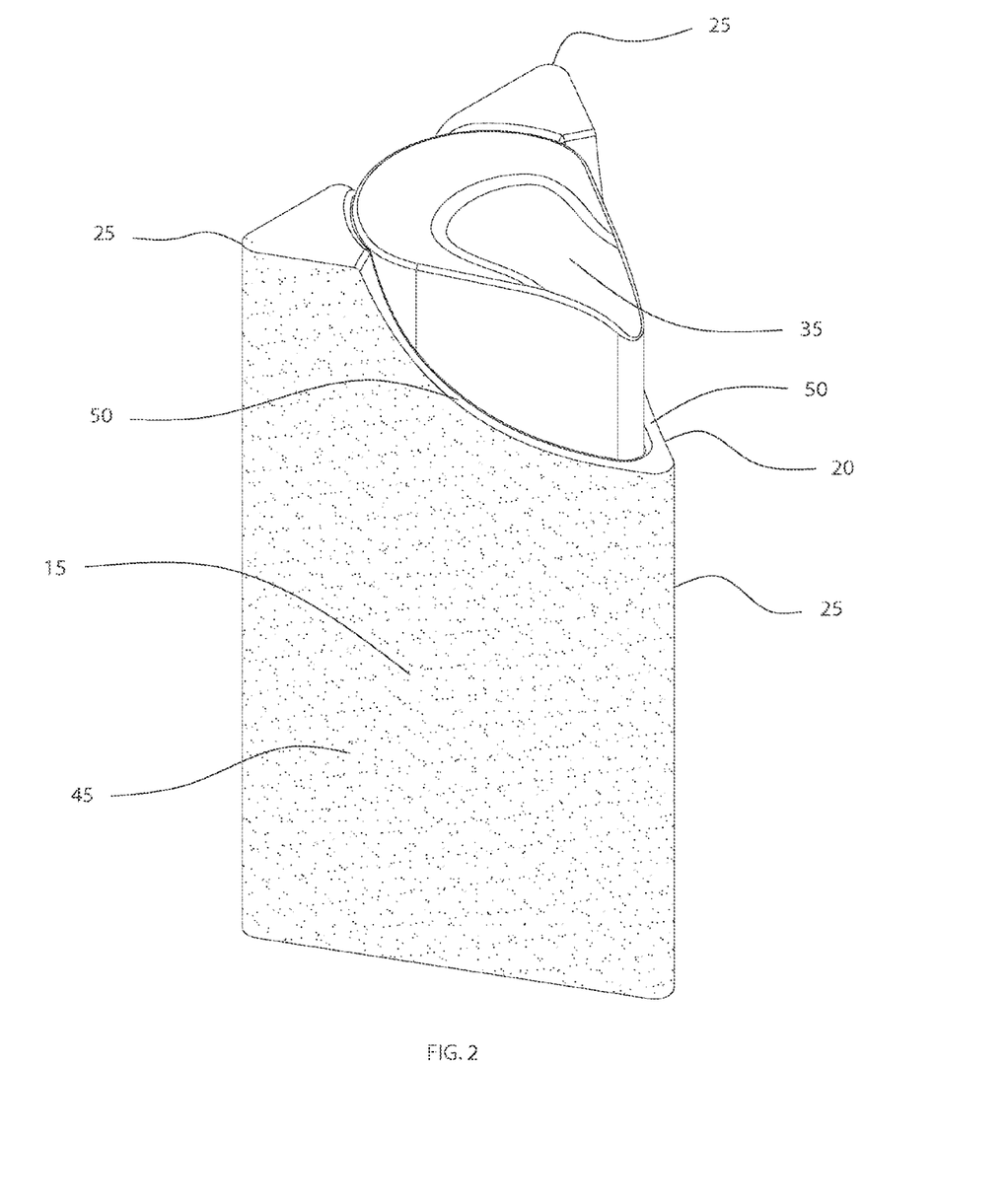
FIG. 2 is perspective view of an embodiment integrated dispenser.

Turning to FIG. 2, second surface 15 and third surface 20 are shaped to define a downwardly sloping contour 50 which allows a user to readily depress actuating cap 35 to operate the dispenser pump 120.

Figure 3:
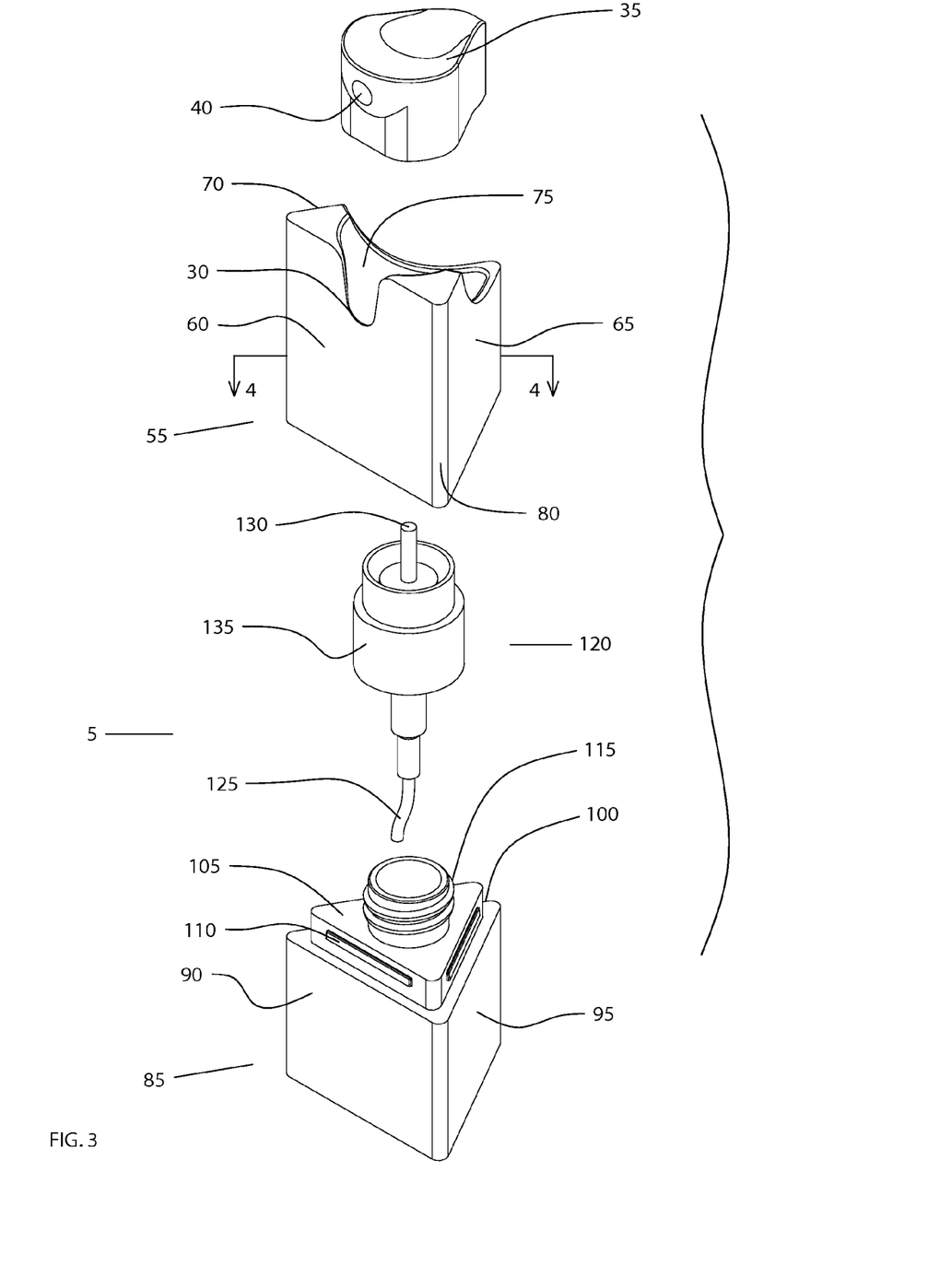
FIG. 3 is an exploded view of an embodiment integrated dispenser.
Figure 4:
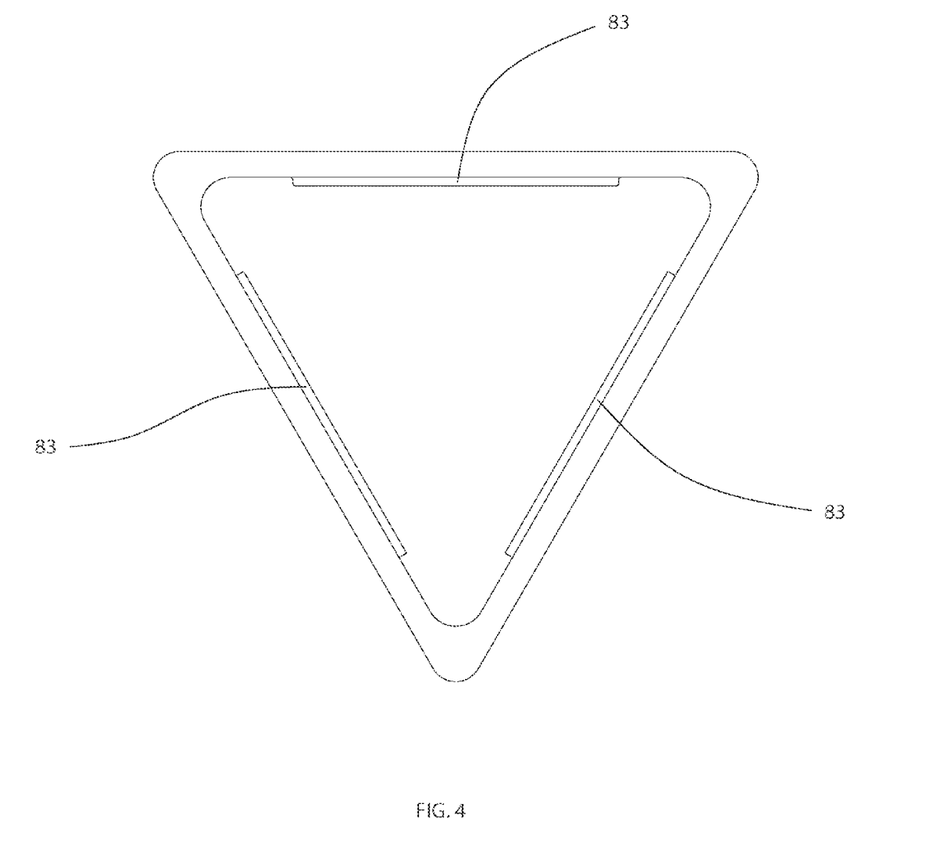
FIG. 4 is cross-sectional view taken through line 4-4 of FIG. 3.

Now as will be seen, FIG. 3 illustrates an exploded view top view of triangularly-shaped apparatus 5. Triangularly shaped top housing 55 having a first housing surface 60, a second housing surface 65, and a third housing surface 70, wherein said top housing 55 is shaped to define a central void 75. First surface 60 is shaped to define notch 30. The surfaces of top housing 55 come together to form rounded housing corners 80. The top housing 55 has within a first locking ridge 83 (seen on FIG. 4 taken through line 4-4 of FIG. 3).

Triangularly shaped reservoir housing 85 is hollow and capable of holding liquid. Reservoir housing 85 has a first reservoir surface 90, a second reservoir surface 95, and a third reservoir surface 100. Housing 85 is shaped to define a triangularly shaped mount 105 bearing a second locking ridge 110. Reservoir housing 85 is further shaped to define a male threaded member 115 which is open on top. Second locking ridge 110 engages first locking ridge 83 (FIG. 4) on top housing 55 reversibly securing top housing and reservoir housing together forming a joined triangularly shaped housing having an external perimetrical surface 140. External surface 140 is wrapped in covering 45, in some embodiments all surfaces are completely covered, in other embodiments only some surfaces are covered. In an alternative embodiment, only a portion of any given surface is covered.

Figure 5:
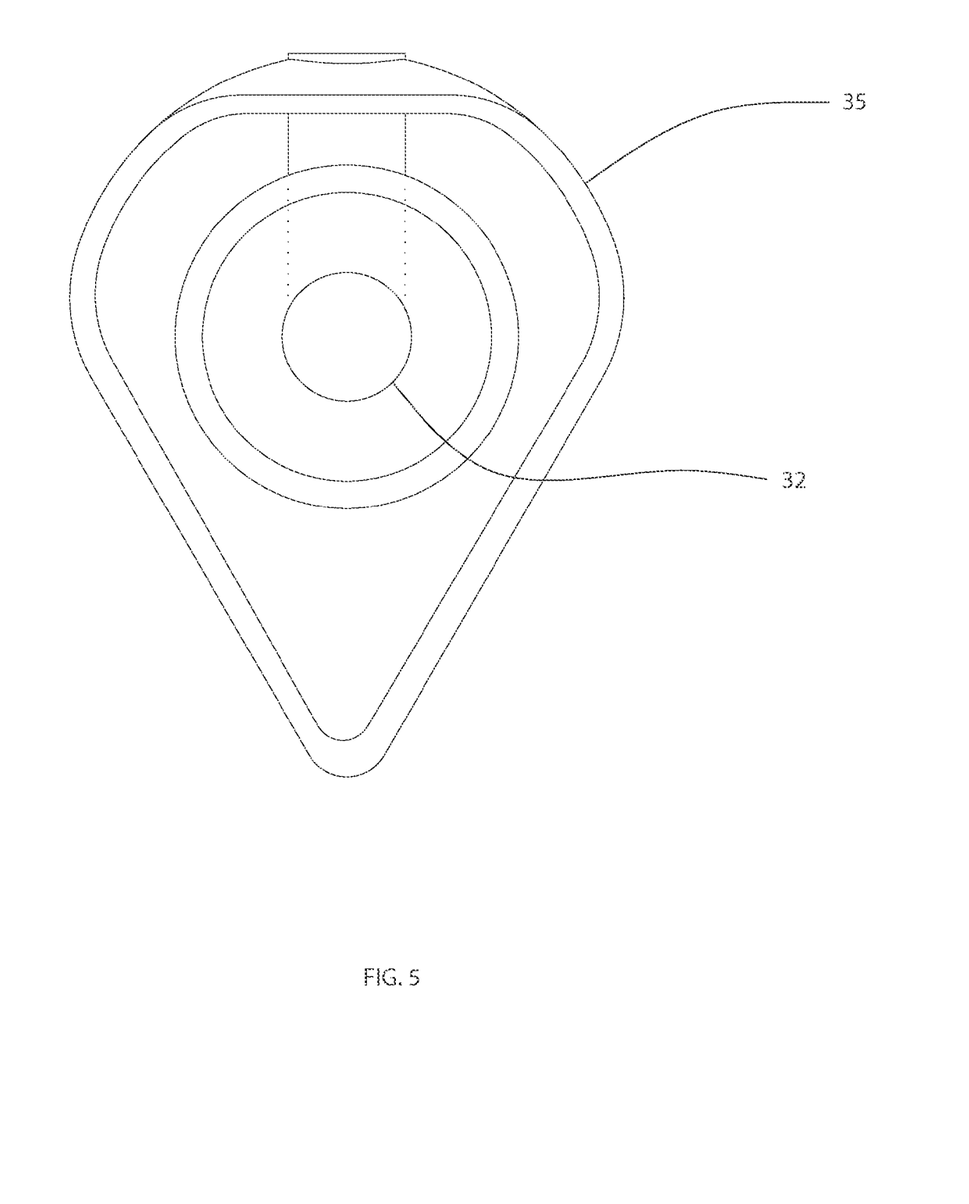
FIG. 5 is an elevation view of the underside of an embodiment cap.

Dispenser pump 120 has dip tube 125 of sufficient length such that the dip tube 125's terminal end is disposed at the approximate bottom of reservoir housing 85. Pump 120 has reciprocating plunger tube 130 which fits within inlet 32 on the underside of cap 35, (seen by FIG. 5). Thus spray outlet 40, is in fluid communication with reciprocating plunger tube 130, actuation of which draws fluid stored within reservoir housing 85 from the terminus of dip tube 125 located at the approximate bottom of reservoir housing 85. Pump housing 135 has female threading and is threadably coupled to male threaded member 115.

Figure 13:
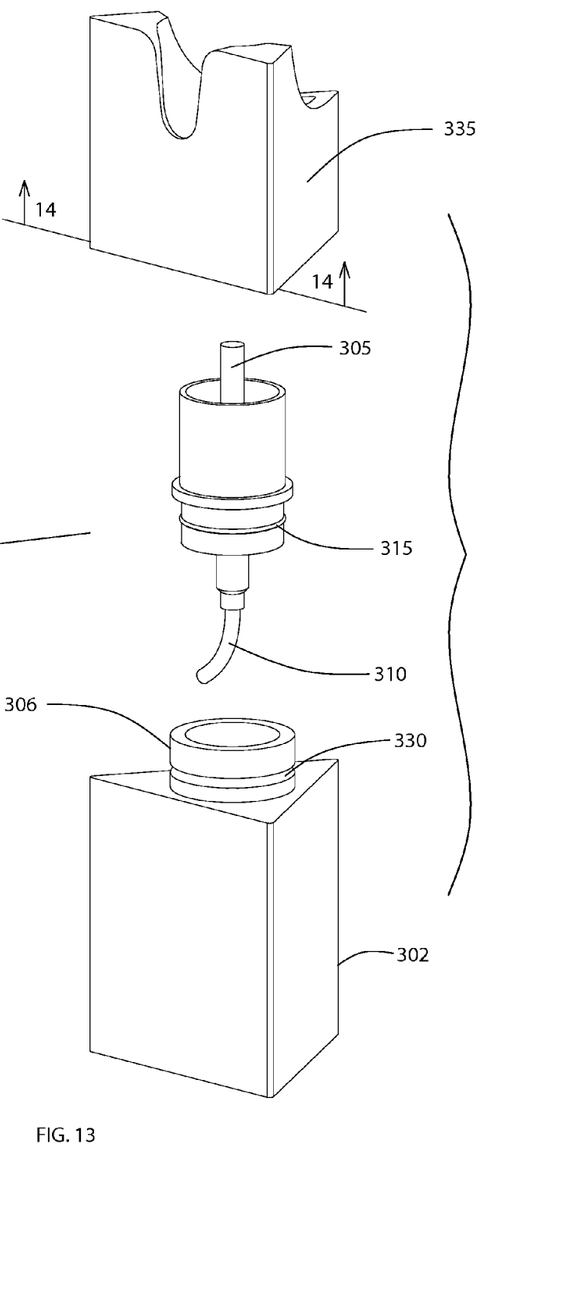
FIG. 13 is alternative embodiment housing and pump apparatus.
Figure 14:
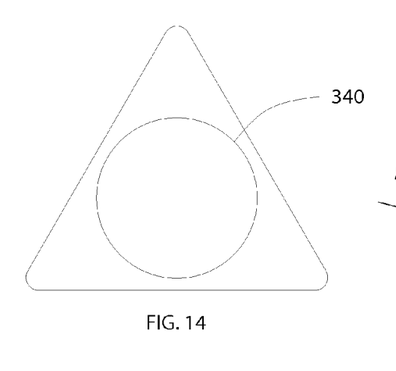
FIG. 14 is a cross-sectional view taken through line 14-14 of FIG. 13.

In an alternative pump housing embodiment illustrated by FIG. 13 an alternative pump assembly 300 is utilized. Pump assembly 300 has reciprocating plunger tube 305, dip tube 310, and annular ring 315. Annular ring 315 snaps within a mating channel of the top portion 306 of reservoir housing 302, reversibly locking pump 300 to reservoir 302. Snap-fit top housing 335 and reservoir housing 302 are snap locked together by locking channel 330 which cooperates with snap-fit aperture 340 to reversible lock the two. It should be readily apparent to those skilled in the art that a variety of pump configurations may be incorporated into the present invention.

Figure 6:
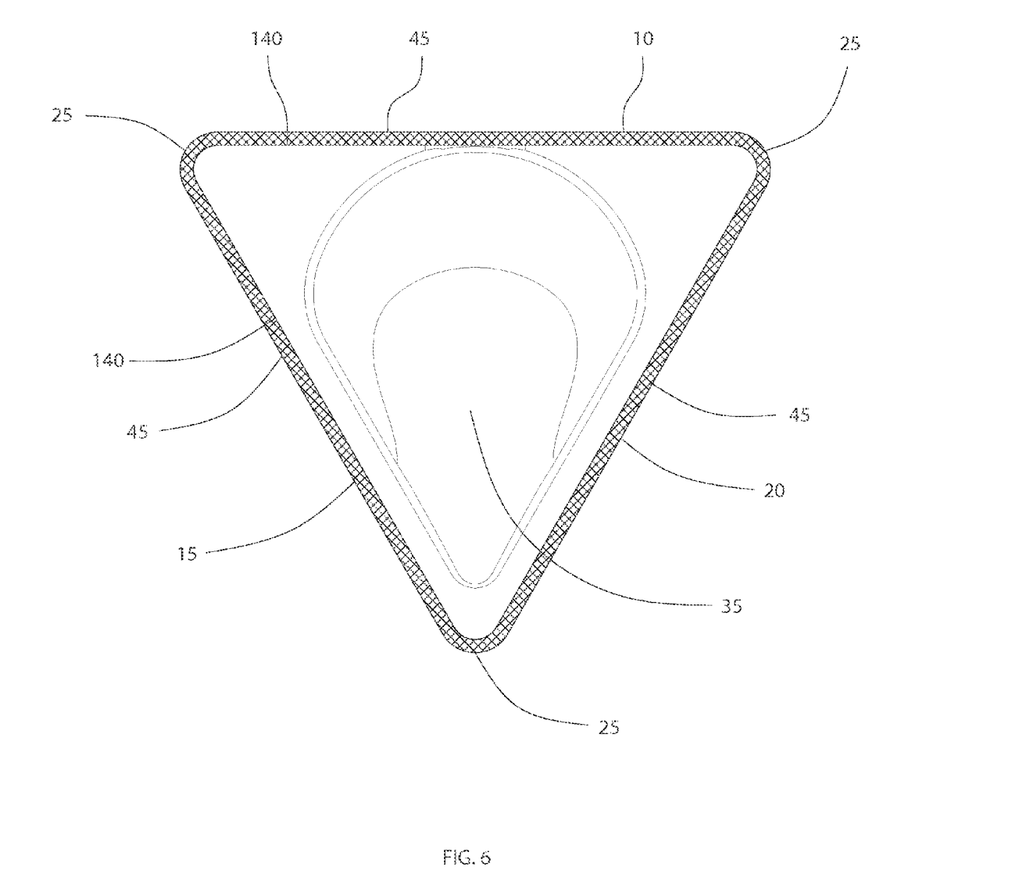
FIG. 6 is a top view an embodiment integrated dispenser showing an embodiment covering layer.

FIG. 6 is a top view illustrating covering 45 affixed the external perimetical surface 140 of triangularly-shaped apparatus 5. In a preferred embodiment, covering 45 is adhesively affixed directly to surface 140.

Figure 7:
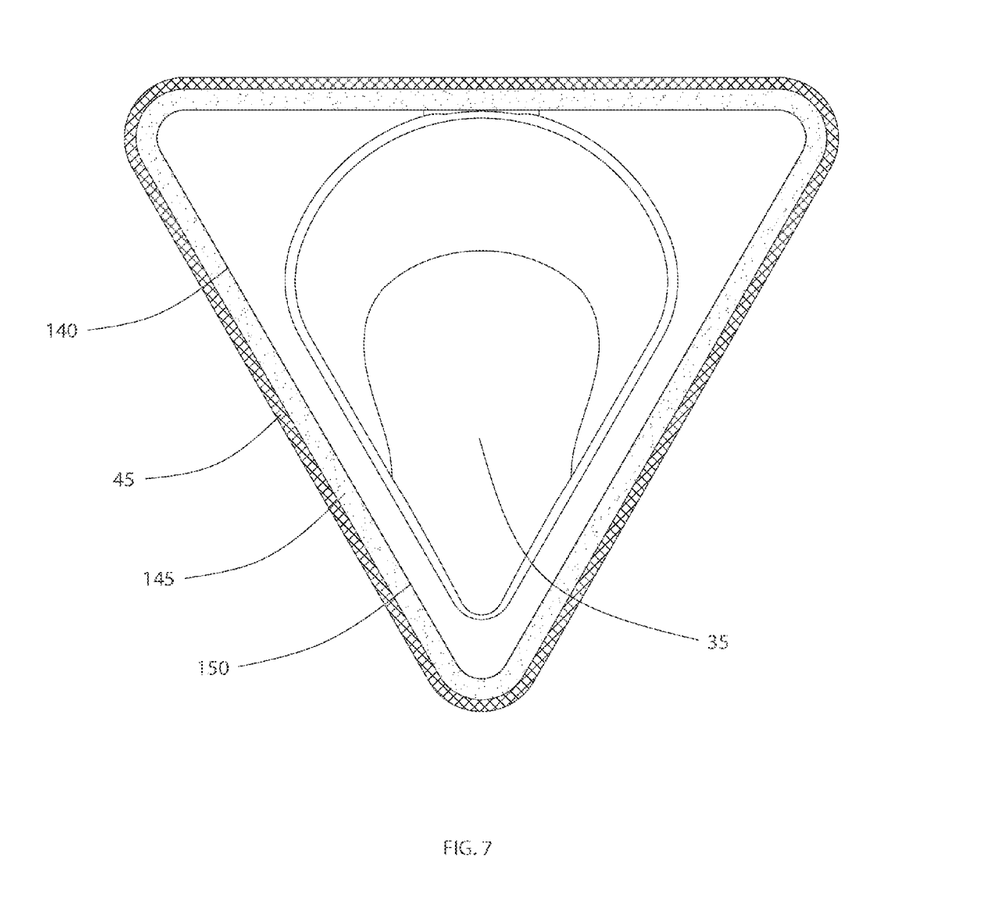
FIG. 7 is a top view of an alternative embodiment integrated dispenser showing an example of embodiment cushioning, attachment, and covering layers.

FIG. 7 illustrates two alternative embodiments which may be utilized independently of each other, but are illustrated together solely for convenience purposes. In the first alternative embodiment, covering 45 is attached to cushioning layer 145 to provide a more conforming contact surface which particularly useful for cleaning any uneven surfaces on a portable electronic device. Cushioning layer 145 may be attached to attachment layer 150, with attachment layer 150, itself, being affixed directly to perimetical surface 140.

Figure 8:
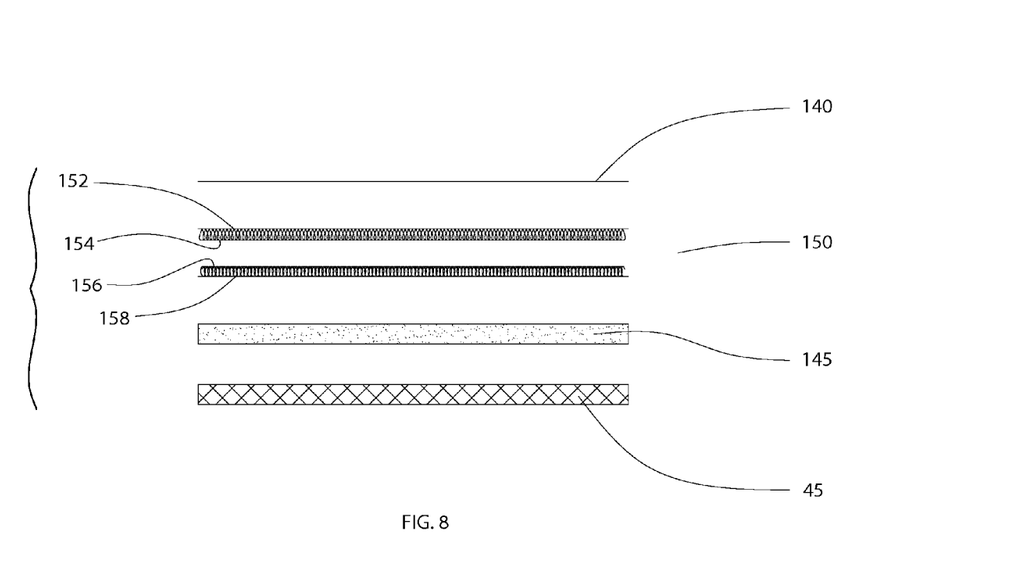
FIG. 8 is an exploded schematic view showing details of embodiment laminate layers.

FIG. 8, shows a first embodiment exploded view of example layers. In this case, attachment layer 150 is a hook-and-loop system with four surfaces. Attachment layer 150 has a first surface 152, a second surface 154, a third surface 156, and a fourth surface 158. The first surface 152 is affixed to the perimetrical surface 140, by adhesive or other means, the second surface 154 is a loop fastener. The third surface 156 is a hook fastener, and the fourth surface 158 is affixed to a first side of cushioning layer 145. The other side of cushioning layer 145 is affixed to cover 45. In another embodiment, cushioning layer 145 is omitted, and the fourth surface 158 is affixed to covering 45.

Figure 9:
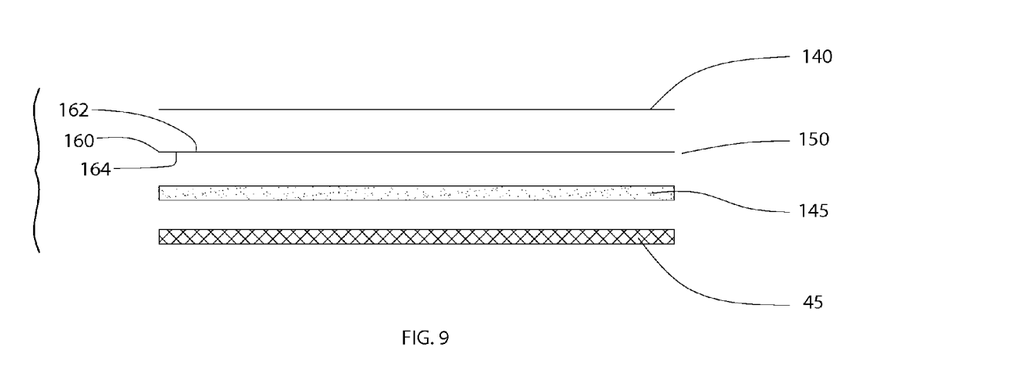
FIG. 9 is an exploded schematic view showing details of embodiment laminate layers.

FIG. 9 shows a second embodiment exploded view of example layering. Attachment layer 150 is an elastic sleeve 160 having a first side 162 and second side 164. The second side 164 is affixed to cushioning layer 145, and cushioning layer 145 is affixed to covering 45. The elastic sleeve 160 with attached cushioning 145 and covering 45 may be slid over apparatus 5 such that the first side 162 of sleeve 160 is in snug engagement with perimetrical surface 140. Alternatively, cushioning 145 is omitted, and the second side 164 of elastic sleeve 160 is attached directly to covering 45.

Figure 10:
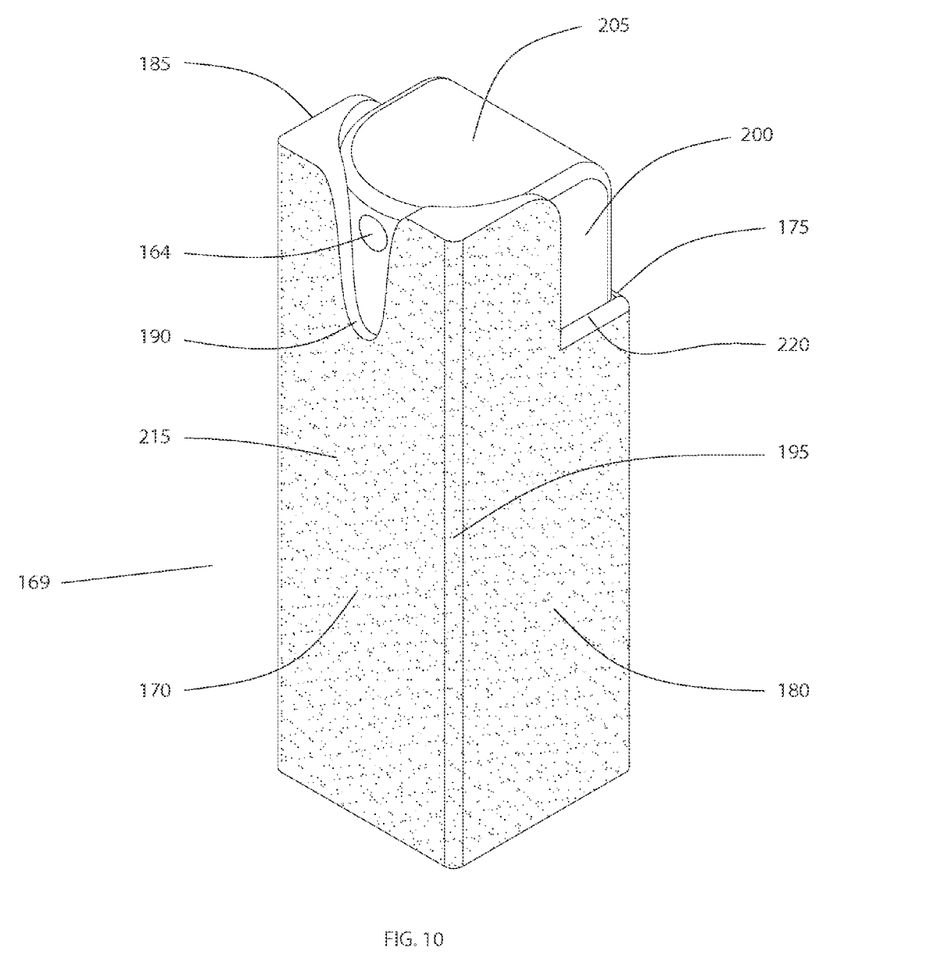
FIG. 10 is a perspective view of an alternative embodiment integrated dispenser.

FIG. 10 illustrates a quadrilaterally-shaped integrated cleaner dispenser apparatus 169 having a front surface 170, a rear surface 175, a first side surface 180, and a second side surface 185, wherein said housing is shaped to define a central void 200, wherein said housing is further shaped to define a notch 190 in said front surface 170. The front surface 170, the rear surface 175, and the first 180 and second 185 side surfaces come together to form rounded corners 195, The corners 195 and surfaces together form an external perimetrical surface. In one embodiment, the first and second side surfaces are shaped to define an L-shaped cutaway 220, to provide access to said dispenser cap 205 which is operatively coupled to plunger tube 130. Appratus 169's housing and reservoir housing is as shown by housing 55 and reservoir housing 85 in FIG. 3 but four-sided. The embodiment pump 120 is contained within as demonstrated by FIG. 3.

Figure 11:
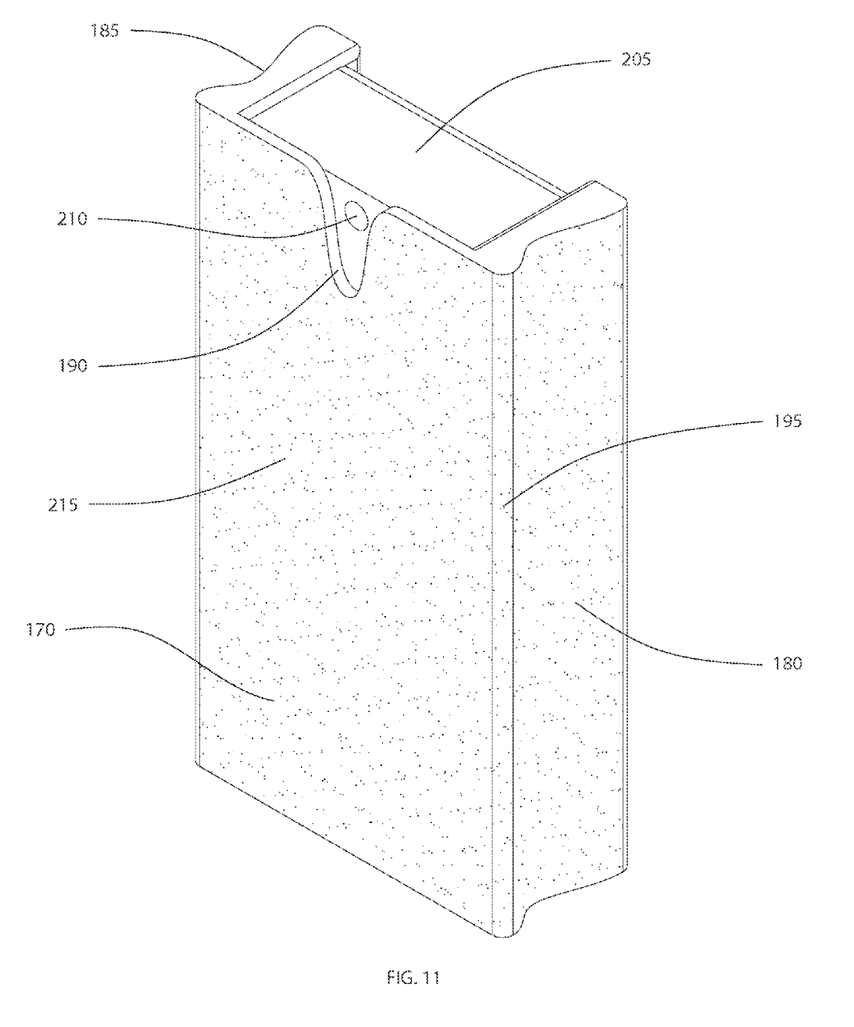
FIG. 11 is a perspective view of an alternative embodiment integrated dispenser.

FIG. 11 illustrates an embodiment quadrilaterally-shaped apparatus having a first side surface 180 and second side surface 185 which are concave relative to notch 190.

Figure 12:
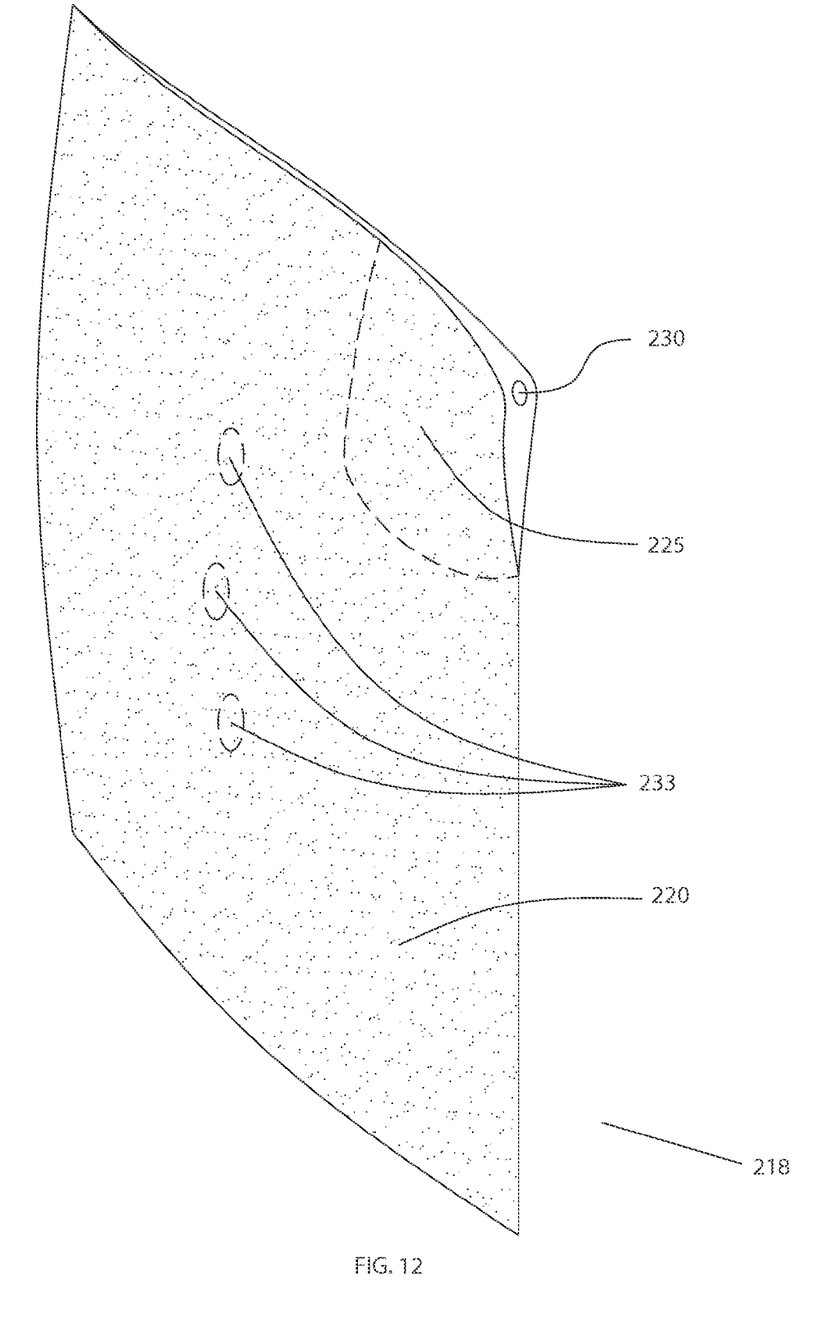
FIG. 12 is a perspective view of an alternative embodiment integrated dispenser.

FIG. 12 illustrates a flexible embodiment 218 where covering 220 encapsulates a liquid or gel pouch container. The flexible liquid pouch allows apparatus 218 to be flexible and used like a towel, yet contain within a dispenser and actuator system 225 located within the pouch. In one embodiment, flowable cleaning fluid may be dispensed from orifice 230. In another embodiment, a plurality of orifices 233 permit flowable cleaning fluid or gel to be expressed directly from the inner pouch to surface 220 when the user squeezes actuator system 225. The actuator location may be optionally indicated on by covering 220 with a pictogram, text, or both.

In use, apparatus 5 shown by FIG. 1 contains cleaning solution held within reservoir housing 85. The user identifies a target surface requiring cleaning, actuates cap 35 to dispense cleaning solution from spray outlet 40 onto the target surface. Holding two of the surfaces, the user brings a third surface covered by cover 45 into contact with the target surface and wipes the surface sufficiently to make clean. Corners 25 are useful in applying more force to stubborn grime or material disposed on the target surface.

Thickness of the microfiber layer may be varied. In one embodiment, the microfiber layer is about 1 mm thickness. While it is certainly recognized that various apparatus sizes may be utilized, it has been discovered that an optimal embodiment size for many portable electronics is about two inches tall and about 1 inch wide. In a specific embodiment apparatus, a height of 2.1 inches (from top to bottom), and a corner-to-corner width of 1.15 inches has proven surprisingly ideal. For larger electronics, an apparatus 4 inches tall by 2 inches wide would be effective—with one effective embodiment measuring 3.8 inches tall by 1.7 inches wide.

One version of the present invention discloses a triangularly shaped body, that is, a body having a cross section of three sides in the shape of a triangle. The triangle may be comprised of equal sides or unequal sides. Disposed within this body a pump dispenser capable of containing and dispensing cleaning solution. A covering is disposed on at least a part of the external surface of the body, the covering adequate to clean relatively smooth surfaces. An alternative version of the present invention discloses a quadrilaterally shaped body—that is a body having a cross-section of four sides in the shape of a quadrilateral. The quadrilateral may be of any shape including a rectangle, square, parallelogram, rhombus, or trapezoid. Disposed within this body is a pump dispenser, capable of containing and dispensing cleaning solution. A covering is disposed on at least a part of the external surface of the body, the covering adequate to clean relatively smooth surfaces.

Although the present invention has been described with reference to the preferred embodiments, it should be understood that various modifications and variations can be easily made by those skilled in the art without departing from the scope and spirit of the invention. Accordingly, the foregoing disclosure should be interpreted as illustrative only and is not to be interpreted in a limiting sense. It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

We claim:

1. An integrated cleaner dispenser apparatus comprising:
    a triangularly shaped top housing having a first surface, a second surface, and a third surface, wherein said housing is shaped to define a central void, wherein said housing is further shaped to define a notch in said first surface, wherein the first surface, the second surface, and the third surface come together to form triangularly shaped housing corners, wherein the triangularly shaped housing corners are rounded, wherein said triangularly shaped top housing has a first locking ridge;
    a triangularly shaped reservoir housing having a first surface, a second surface, and a third surface, wherein said housing is shaped to define a triangularly shaped mount, said triangularly shaped mount having a second locking ridge, wherein said triangularly shaped reservoir housing is further shaped to define a male threaded member, wherein said second locking ridge on the triangularly shaped mount engages said first locking ridge on top housing reversibly securing top housing and reservoir housing together forming a joined triangularly shaped housing having an external perimetrical surface formed of said surfaces and said corners, wherein second and third surface are shaped to define a downwardly sloping contour;
    a dispenser pump housing is shaped to define a female threading, said dispenser pump having a reciprocating plunger tube and a dip tube, wherein the female threading may be threadably coupled to the male threaded member, wherein the dip tube is of sufficient length to be at the approximate bottom of said reservoir housing;
    an actuating cap having a spray outlet, further shaped to define an inlet, wherein the reciprocating plunger tube engages said inlet, wherein said inlet is in fluid communication with said spray outlet, the reciprocating plunger tube is in fluid communication with the dip tube;
    a cover layer affixed to the integrated cleaner dispenser apparatus wherein said cover layer covers the external perimetrical surface.

2. The integrated cleaner dispenser apparatus of claim 1, further comprising a laminate cushioning, wherein said laminate cushioning is affixed to the external surface of the joined triangularly shaped housing, wherein said cover layer is a microfiber laminate layer affixed to the laminate cushioning.

3. An integrated cleaner dispenser apparatus comprising:
    a triangularly shaped top housing having a first surface, a second surface, and a third surface, wherein said housing is shaped to define a central void, wherein said housing is further shaped to define a notch in said first surface, wherein the first surface, the second surface, and the third surface come together to form triangularly shaped housing corners, wherein the triangularly shaped housing corners are rounded, wherein said triangularly shaped top housing has a first locking ridge, wherein said second and third surface are shaped to define a downwardly sloping contour;
    a triangularly shaped reservoir housing having a first surface, a second surface, and a third surface, wherein said housing is shaped to define a triangularly shaped mount, said triangularly shaped mount having a second locking ridge, wherein said triangularly shaped reservoir housing is further shaped to define a male threaded member, wherein said second locking ridge on the triangularly shaped mount engages said first locking ridge on top housing reversibly securing top housing and reservoir housing together forming a joined triangularly shaped housing having an external surface;
    a dispenser pump housing is shaped to define a female threading, said dispenser pump having a reciprocating plunger tube and a dip tube, wherein the female threading may be threadably coupled to the male threaded member, wherein the dip tube is of sufficient length to be at the approximate bottom of said reservoir housing;
    an actuating cap having a spray outlet, further shaped to define an inlet, wherein the reciprocating plunger tube engages said inlet, wherein said inlet is in fluid communication with said spray outlet, the reciprocating plunger tube is in fluid communication with the dip tube;
    an attachment layer affixed to the integrated cleaner dispenser apparatus wherein said attachment layer covers the external surface of the joined triangularly shaped housing;
    at least one layer attached to said attachment layer.

4. The integrated cleaner dispenser apparatus of claim 3, wherein said attachment layer has a first surface and a second surface, wherein said first surface is adhesively affixed to said joined triangular housing, wherein said second surface is a loop fastener, wherein said layer is a microfiber layer having a use surface and back surface, further comprising a hook fastener, wherein said hook fastener is affixed to the back surface of said microfiber layer, wherein said loop fastener and said hook fastener may reversibly engage, whereby microfiber layer is secured to said apparatus.

5. The integrated cleaner dispenser apparatus of claim 3, wherein said attachment layer is an elastic sleeve having a first side and second side, wherein said layer is a cushioning layer having a first side and second side, and the second side of elastic sleeve is affixed to the first side of the cushioning layer, further comprising a microfiber covering affixed to the second side of the cushioning layer, wherein the elastic sleeve with attached cushioning layer and covering may be slid over the apparatus such that the first side of sleeve is in snug engagement with the perimetrical surface.

6. The integrated cleaner dispenser apparatus of claim 3, wherein said attachment layer is an elastic sleeve having a first side and second side, wherein said layer is a microfiber layer having a first side and second side, wherein the second side of elastic sleeve is affixed to the first side of the microfiber layer, wherein the elastic sleeve with attached microfiber layer and covering may be slid over the apparatus such that the first side of sleeve is in snug engagement with the perimetrical surface.

7. An integrated cleaner dispenser apparatus comprising:
   a quadrilaterally shaped housing having a front surface, a rear surface, a first side surface, and a second side surface, wherein said housing is shaped to define a central void, wherein said housing is further shaped to define a notch in said front surface, wherein the front surface, the rear surface, and the first and second side surfaces come together to form corners, wherein the corners are rounded, wherein said corners and surfaces together form an external surface;
   a reservoir disposed within the housing;
   a dispenser pump, having an actuator cap, disposed within the housing and in operative communication with said reservoir, said cap having a spray outlet operatively coupled to said pump;
   a layering comprising an attachment layer, wherein said attachment layer is an elastic sleeve having a first side and second side, a cushioning layer affixed to the second side a covering affixed to the cushioning layer
   wherein the elastic sleeve with attached cushioning and covering may be slid over the quadrilaterally shaped housing such that the first side of sleeve is in snug engagement with the housing's front surface, rear surface, first side surface, and second side surface,
   wherein said covering is a microfiber laminate layer affixed to the integrated cleaner dispenser apparatus wherein said microfiber laminate layer covers the external surface of the quadrilaterally shaped housing.

8. The integrated cleaner dispenser apparatus of claim 7, wherein said first and second side surfaces are shaped to define an L-shaped cutaway, wherein L-shaped cutaway provides access to said dispenser pump actuator cap.

9. The integrated cleaner dispenser apparatus of claim 7, wherein said first and second sides of lesser length than said front side and said rear side, wherein said first and second sides are concavely curved relative to the notch.

* * * * *